US007292684B2

(12) United States Patent (10) Patent No.: US 7,292,684 B2
Kurosaki (45) Date of Patent: Nov. 6, 2007

(54) USER INFORMATION MANAGEMENT PROGRAM AND USER INFORMATION MANAGEMENT DEVICE

(75) Inventor: Kiyoshi Kurosaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 104 days.

(21) Appl. No.: 10/785,092

(22) Filed: Feb. 25, 2004

(65) Prior Publication Data

US 2004/0264659 A1 Dec. 30, 2004

(30) Foreign Application Priority Data

Jun. 26, 2003 (JP) ............................. 2003-182831

(51) Int. Cl.
H04M 1/56 (2006.01)
H04M 15/06 (2006.01)
H04M 3/00 (2006.01)
H04M 5/00 (2006.01)

(52) U.S. Cl. ............................. 379/142.04; 379/266.1; 379/265.01

(58) Field of Classification Search ............... 379/9.04, 379/15.03, 142.04, 201.12, 214.01, 265.01, 379/265.03, 265.06, 265.07, 266.01, 266.1, 379/262
See application file for complete search history.

(56) References Cited

U.S. PATENT DOCUMENTS 5,937,051 A * 8/1999 Hurd et al. ............ 379/212.01
6,185,287 B1 * 2/2001 Miloslavsky ............... 379/219
6,404,883 B1 * 6/2002 Hartmeier ............. 379/265.03
6,628,755 B2 * 9/2003 Shimada et al. ........... 379/9.04
6,904,143 B1 * 6/2005 Peterson et al. ....... 379/265.01
6,996,222 B2 * 2/2006 Chakera ................ 379/212.01

FOREIGN PATENT DOCUMENTS

| JP | 9-139772 | 5/1997 |
| JP | 11-234408 | 8/1999 |
| JP | 2000-332898 A | 11/2000 |
| JP | 2002-283190 | 10/2002 |

OTHER PUBLICATIONS

Japanese Office Action mailed Sep. 26, 2006 in corresponding Japanese Application No. 2003-182831.

* cited by examiner

*Primary Examiner*—Quoc Tran
(74) *Attorney, Agent, or Firm*—Staas & Halsey LLP

(57) ABSTRACT

Transmission-record information is created based on information that has been transmitted to a user communication device in response to a first user call for utilizing an information provision service. The transmission-record information is then transmitted to an operator terminal device that responds to the first user call or a second user call different from the first user call. The second user call is another call from a user who has transmitted the first user call by the user communication device.

14 Claims, 10 Drawing Sheets

FIG.4

| INCOMING CALL RECEPTION NUMBER | PROCESSING IDENTIFICATION NUMBER | STARTING TIME | ENDING TIME | COMPLETION/INCOMPLETION FLAG |
|---|---|---|---|---|
| 1-1 | P01 | 10:00:00 | 10:00:05 | COMPLETED |
| 1-1 | P02 | 10:00:06 | 10:00:15 | COMPLETED |
| 1-1 | P03 | 10:00:16 | 10:00:26 | COMPLETED |
| 1-1 | P05 | 10:00:27 | 10:01:07 | NOT COMPLETED |
| 1-1 | P03 | 10:01:08 | 10:01:17 | COMPLETED |
| 1-2 | P01 | 10:01:15 | 10:01:20 | COMPLETED |
| 1-1 | P06 | 10:01:18 | 10:02:08 | COMPLETED |
| 1-2 | P02 | 10:01:21 | 10:01:30 | COMPLETED |
| 1-2 | P03 | 10:01:31 | 10:01:42 | COMPLETED |
| 1-1 | P09 | 10:02:09 | 10:02:19 | COMPLETED |
| 1-2 | P13 | 10:01:43 | 10:03:43 | INCOMING CALL TO OPERATOR |
| 1-2 | P12 | 10:02:20 | 10:04:00 | COMPLETED |
| 1-1 | P03 | 10:04:01 | 10:04:10 | COMPLETED |
| 1-1 | P13 | 10:04:11 | 10:04:25 | INCOMING CALL TO OPERATOR |
| ... | ... | ... | ... | ... |

FIG.5

| CONDITION IDENTIFICATION NUMBER | DISPLAY CONDITION | DISPLAY CONTENTS |
|---|---|---|
| 1 | TRANSMISSION OF EXPLANATION ABOUT PRODUCT A (P04) IS COMPLETED | DETAILED EXPLANATION ABOUT PRODUCT A |
| 2 | TRANSMISSION OF EXPLANATION ABOUT PRODUCT B (P05) IS COMPLETED | DETAILED EXPLANATION ABOUT PRODUCT B |
| 3 | TRANSMISSION OF EXPLANATION ABOUT PRODUCT C (P06) IS COMPLETED | DETAILED EXPLANATION ABOUT PRODUCT C |
| 4 | TRANSMISSION OF DETAILED EXPLANATION ABOUT PRODUCT A (P10) IS COMPLETED | CAMPAIGN OF PRODUCT A |
| 5 | TRANSMISSION OF DETAILED EXPLANATION ABOUT PRODUCT B (P11) IS COMPLETED | CAMPAIGN OF PRODUCT B |
| 6 | TRANSMISSION OF DETAILED EXPLANATION ABOUT PRODUCT C (P12) IS COMPLETED | CAMPAIGN OF PRODUCT C |
| 7 | WAITING TIME FOR TRANSFER TO OPERATOR IS 60 SECONDS OR MORE | CUSTOMER WAITING LONG FOR TRANSFER (APOLOGY IS NECESSARY) |
| 8 | DIRECT INCOMING CALL TO OPERATOR | OPERATOR DIRECT |
| ... | ... | ... |

USER INFORMATION MANAGEMENT PROGRAM AND USER INFORMATION MANAGEMENT DEVICE

BACKGROUND OF THE INVENTION

1) Field of the Invention

The present invention relates to a user information management program and a user information management device capable of managing information concerning a user who utilizes an information provision service that transmits information to a communication apparatus according to a signal transmitted from a transmitter having a communication function. Particularly, the present invention relates to a user information management program and a user information management device that can reduce burdens of an operator who responds to a call from a user, and that can manage user information so as to be able to respond to the user promptly and properly.

2) Description of the Related Art

Conventionally, an information provision service is widely provided using an interactive voice response (hereinafter, "IVR") device that provides product information or the like by reproducing voice recorded in advance corresponding to a push button signal (PB signal) that is transmitted from a telephone.

A user of this service can obtain various kinds of information by transmitting a push button signal. When the provided information is insufficient, the user can directly communicate with an operator by connecting a line to the operator.

After the user disconnects the line after communicating with the operator, the user sometimes wants to obtain more relevant information by telephoning again. However, the user cannot always communicate with the same operator with whom the user talked before, and the user must explain the situation again to another operator, which is inconvenient.

To cope with this situation, for example, Japanese Patent Application Laid-open No. 2000-332898 discloses a customer correspondence system that stores correspondence information that the operator communicates with the customer. When the customer calls again and wants to communicate with the operator, this customer correspondence system reads the past response information, and transfers the customer call to a telephone terminal of the same operator who talked with the customer before. This system displays the response information in a display device of the operator.

However, according to the conventional technique disclosed in Japanese Patent Application Laid-open No. 2000-332898, only the response information up to the time of receiving the telephone last time is notified to the operator. It is not clear what the customer wants this time on the telephone, and the operator finds it difficult to respond to the customer promptly and properly.

Specifically, even when the operator can confirm the information responded to the customer last time, the customer may call the operator for other reason than that when the customer called last time. In this case, the operator must ask the customer or receive an explanation about the state from the customer. Therefore, not only burdens are imposed on the operator but also convenience of the service for the customer is lost.

SUMMARY OF THE INVENTION

It is an object of the present invention to at least solve the problems in the conventional technology.

A computer program product according to one aspect of the present invention includes computer executable instructions stored on a computer readable medium, wherein the instructions, when executed by the computer, cause the computer to perform the following: (1) creating transmission-record information based on information that has been transmitted to a user communication device in response to a first user call for utilizing an information provision service; and (2) transmitting the transmission-record information to an operator terminal device that responds to one of the first user call and a second user call different from the first user call, the second user call being another call from a user who has transmitted the first user call by the user communication device.

A user information management apparatus according to another aspect of the present invention includes a transmission-record information creator that creates transmission-record information based on information that has been transmitted to a user communication device in response to a first user call for utilizing an information provision service; and a transmitter that transmits the transmission-record information to an operator terminal device that responds to one of the first user call and a second user call different from the first user call, the second user call being another call from a user who has transmitted the first user call by the user communication device.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 4 illustrates one example of log information shown in FIG. 3;

FIG. 5 illustrates one example of a supporting information display condition table shown in FIG. 3;

DETAILED DESCRIPTION

Exemplary embodiments of a service cooperation device according to the present invention will be explained in detail below with reference to the accompanying drawings. In the present embodiment, the application of the present invention to an information provision service that provides an explanation about various kinds of products to customers will be explained.

Figure 1:
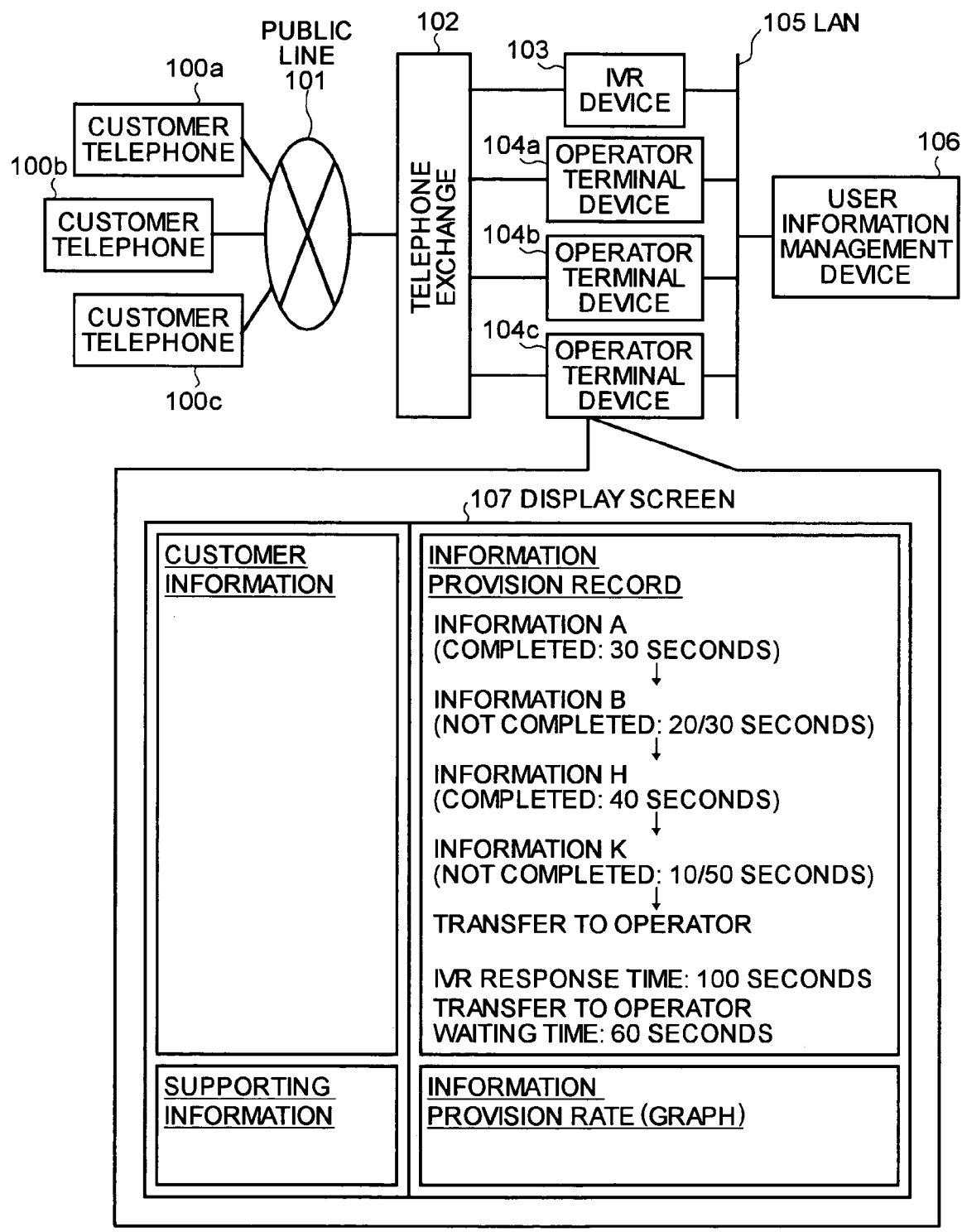
FIG. 1 is an illustration of a user information management system including a user information management device according to the present invention.

First, a concept of a processing that a user information management system according to the present embodiment carries out will be explained. FIG. 1 illustrates the concept of the processing that the user information management system according to the present embodiment carries out.

As shown in FIG. 1, this user information management system has customer telephones 100a to 100c connected to a telephone exchange 102 via a public line 101. The telephone exchange 102 is connected to an IVR device 103 and operator terminal devices 104a to 104c. The IVR device 103 and the operator terminal devices 104a to 104c are connected to a user information management device 106 via a LAN 105.

The customer telephones 100a to 100c are used for customers to obtain information about various kinds of products. The customer telephones 100a to 100c transmit a push button signal to select information to be obtained, and receive voice information that is transmitted accordingly.

The telephone exchange 102 connects the customer telephones 100a to 100c with the IVR device 103 or the operator terminal devices 104a to 104c via the public line 101. When calls made by the customer telephones 100a to 100c, the telephone exchange 102 connects the calls from the customer telephones 100a to 100c to the IVR device 103.

When the telephone exchange 102 receives requests from the customer telephones 100a to 100c for connection to an operator, the telephone exchange 102 disconnects the connection between the customer telephones 100a to 100c and the IVR device 103, and establishes connection between the customer telephones 100a to 100c and the operator terminal devices 104a to 104c.

When the telephone exchange 102 establishes connection between the customer telephones 100a to 100c and the IVR device 103, the IVR device 103 receives push button signals that are transmitted from the customer telephones 100a to 100c. The IVR device 103 transmits product information corresponding to the push button signals to the customer telephones 100a to 100c.

The IVR device 103 transmits information including contents of processing carried out and a processing time taken to respond to the push button signals transmitted from the customer telephones 100a to 100c, as log information, to the user information management device 106.

When the IVR device 103 receives push button signals from the customer telephones 100a to 100c requesting for connection to an operator, the IVR device 103 requests the telephone exchange 102 to establish connection between the customer telephones 100a to 100c and the operator terminal devices 104a to 104c.

The operator terminal devices 104a to 104c have a function to enable operators to communicate directly with customers when connection is established between the customer telephones 100a to 100c and the operator terminal devices 104a to 104c.

The operator terminal devices 104a to 104c receive information about kinds of product information provided to the customer telephones 100a to 100c and time taken to provide the information, from the user information management device 106. The operator terminal devices 104a to 104c display these pieces of information on a screen 107 of a display device that is provided at each of the operator terminal devices 104a to 104c.

The user information management device 106 receives from the IVR device 103 the log information concerning the contents of processing carried out and the processing time taken for the IVR device 103 to respond to the requests from the customer telephones 100a to 100c. The user information management device 106 creates information concerning a transmission record of each piece of information (i.e., a record of providing information) transmitted to the customer telephones 100a to 100c based on the log information. The user information management device 106 then outputs the created transmission record information to the operator terminal devices 104a to 104c corresponding to the customer calls.

While one IVR device 103 is used in this example, when a plurality of IVR devices 103 are available, the user information management device 106 receives log information from the plurality of IVR devices 103, and creates information concerning transmission records of pieces of information that are transmitted to the customer telephones 100a to 100c.

As explained above, when connection is established between the customer telephones 100a to 100c and the operator terminal devices 104a to 104c, the user information management device 106 outputs transmission records of pieces of information (information provision records) that are transmitted to the customers, to the operator terminal devices 104a to 104c of operators who respond to the customers. Therefore, the operators can confirm the information that the customers already have, by confirming the display screen 107, and can respond to the customers promptly and properly.

Figure 2:
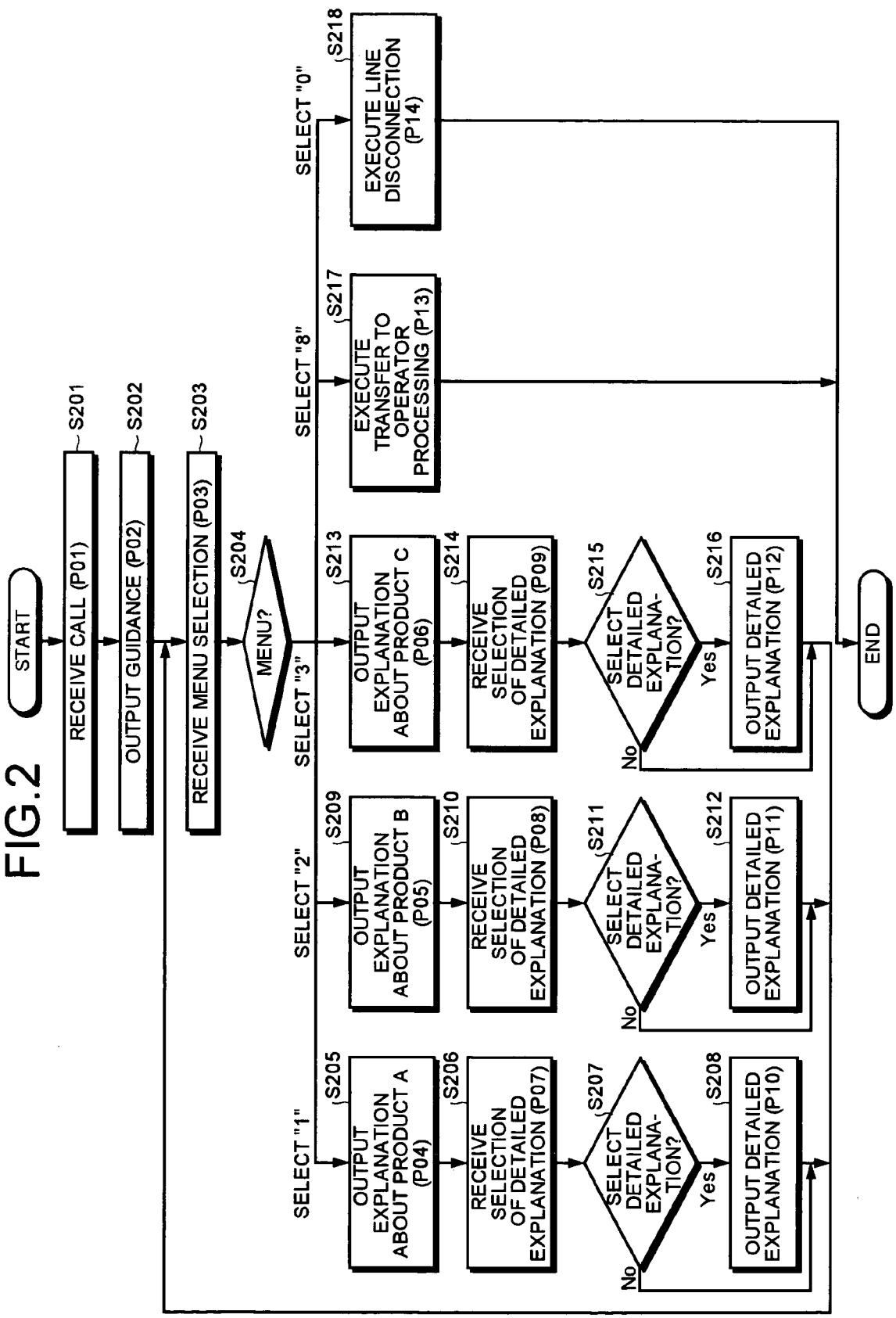
FIG. 2 is a flowchart that illustrates steps of a processing that an IVR device shown in FIG. 1.

Steps of the processing that the IVR device 103 according to the present embodiment carries out will be explained next. FIG. 2 is a flowchart that illustrates steps of the processing that the IVR device 103 according to the present embodiment carries out. In FIG. 2, each processing is allocated with an identification number that identifies this processing. The identification number is indicated like P01, for example, within parentheses in FIG. 2.

As shown in FIG. 2, this IVR device 103 first receives calls from the customer telephones 100a to 100c (step S201). The IVR device 103 outputs a guidance of the product information service, and notifies the customers about a method of utilizing this information provision service (step S202). Specifically, the IVR device 103 explains about push button signals for the customers to transmit in order to obtain necessary information.

After outputting the guidance, the IVR device 103 receives push button signals that are transmitted from the customers (step S203), and executes a processing to check numbers of the push button signals (step S204). When the push button signal is "1", the IVR device 103 outputs an explanation about product A (step S205).

The IVR device 103 receives a selection about whether a detailed explanation about the product A is necessary, from the customer (step S206). When the customer selects the detailed explanation (Yes at step S207), the IVR device 103 outputs the detailed explanation (step S208), and shifts to step S203. When the customer does not select the detailed explanation (No at step S207), the IVR device 103 shifts to step S203.

When the push button signal is "2", an explanation about product B is output (step S209). The IVR device 103 receives a selection about whether a detailed explanation about the product B is necessary, from the customer (step S210). When the customer selects the detailed explanation (Yes at step S211), the IVR device 103 outputs the detailed explanation (step S212), and shifts to step S203. When the customer does not select the detailed explanation (No at step S211), the IVR device 103 shifts to step S203.

When the push button signal is "3", an explanation about product C is output (step S213). The IVR device 103 receives a selection about whether a detailed explanation about the product C is necessary, from the customer (step S214). When the customer selects the detailed explanation (Yes at step S215), the IVR device 103 outputs the detailed explanation (step S216), and shifts to step S203. When the customer does not select the detailed explanation (No at step S215), the IVR device 103 shifts to step S203.

When the push button signal is "8", the IVR device 103 requests the telephone exchange 102 to transfer the call from the customer to a corresponding one of the operator terminal devices 104a to 104c (step S217). When the push button signal is "0", the IVR device 103 disconnects the line with the customer (step S218).

The customer can stop the IVR device 103 carry out each of the above processing at any optional point of time. For example, while the customer is listening to the explanation about the product A that is output from the IVR device 103 after transmitting the push button signal of "1", the customer can transmit the push button signal of "3" to switch to the explanation about the product C in the middle.

Each time when each processing shown in FIG. 2 is carried out, the IVR device 103 outputs log information concerning the contents of processing carried out and the processing time taken, to the user information management device 106.

Figure 3:
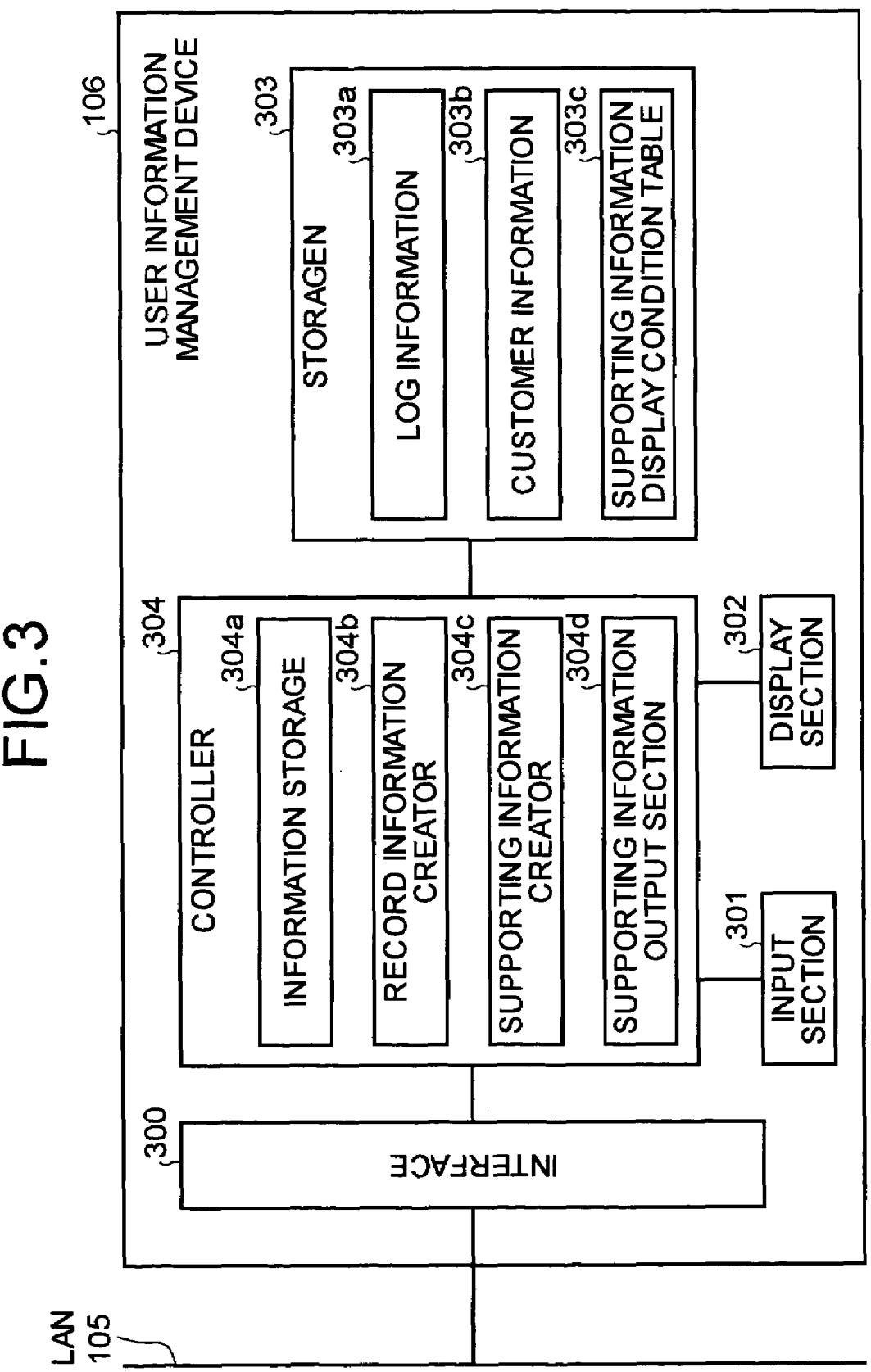
FIG. 3 is a functional block diagram that illustrates a functional configuration of a user information management device shown in FIG. 1.

A functional configuration of the user information management device 106 shown in FIG. 1 will be explained next. FIG. 3 is a functional block diagram that illustrates the functional configuration of the user information management device 106 shown in FIG. 1. As shown in FIG. 3, the user information management device 106 has an interface 300, an input section 301, a display section 302, a storage 303, and a controller 304.

The interface 300 is a network interface that exchanges data between the user information management device 106 and the IVR device 103 and the operator terminal devices 104a to 104c via the LAN 105. The input section 301 is an input device such as a keyboard and a mouse, and the display section 302 is a display device such as a cathode ray tube (CRT).

The storage 303 is a storage such as a hard disk device, and stores log information 303a, customer information 303b, and a supporting information display condition table 303c.

The log information 303a is information received from the IVR device 103, and is recorded information of a processing carried out by the IVR device 103. FIG. 4 illustrates one example of the log information 303a shown in FIG. 3. As shown in FIG. 4, the log information 303a includes an incoming call reception number, a processing identification number, a starting time, an ending time, and a completion/incompletion flag.

The incoming call reception number is information that indicates a port of the IVR device 103 in which a call made by the customer, and that includes two numerals like "1-2". In this example, the first numeral "1" indicates a number of the IVR device 103 in which a call made by the customer. The latter numeral "2" indicates a port number of a port of the IVR device 103 in which the call arrives.

The identification number identifies each processing shown in FIG. 2. This is the identification number of each processing that the IVR device 103 carries out according to the push button signals received from the customer telephones 100a to 100c. The starting time and the ending time indicate a starting time and an ending time of each processing that the IVR device 103 carries out.

The completion/incompletion flag indicates whether each processing is carried out to the end. For example, during the processing of outputting the explanation about the product A and before outputting all the explanation, when the customer switches to the explanation about a different product, the completion/incompletion flag of the output processing of the explanation about the product A becomes "incompletion". When a call from the customer is transferred to the operator, the completion/incompletion flag becomes "call arrival to the operator".

Referring back to FIG. 3, the customer information 303b is stored information of customer individual information. Specifically, the customer information 303b stores information such as name, address, and telephone number of the customer, and information about products purchased by the customer in the past.

The supporting information display condition table 303c stores a display condition about whether supporting information that supports the operator in responding to the customer is to be displayed in the display device of the corresponding one of the operator terminal devices 104a to 104c when the all from the customer is transferred to this operator terminal device.

FIG. 5 illustrates one example of the supporting information display condition table 303c shown in FIG. 3. As shown in FIG. 5, this supporting information display condition table 303c includes a condition identification number, a display condition, and display contents.

The condition identification number identifies each display condition. The display condition is used to decide whether the supporting information to support a response to the customer is to be displayed in the corresponding display device of the operator terminal devices 104a to 104c. When this condition is satisfied, the supporting information is displayed in the display device. The display contents are displayed in the corresponding display devices of the operator terminal devices 104a to 104c when the display condition is satisfied.

For example, when the condition identification number is "1", the display condition is whether "transmission of the "explanation about the product A (P04) is completed". When the transmission is completed, information of "detailed explanation about the product A" is displayed in the corresponding display device of the operator terminal devices 104a to 104c.

In this case, when the customer listens to the explanation about the product A to the end of the explanation, it is decided that the customer has interests in the product A. Therefore, the supporting information of the "detailed explanation about the product A" is presented to the operator to urge the operator to explain about the product A in detail. Thus, the operator can respond to the customer promptly and properly.

Referring back to FIG. 3, the controller 304 controls the user information management device 106 as a whole, and includes an information storage 304a, a record information creator 304b, a supporting information creator 304c, and a record information output section 304d.

The information storage 304a receives the log information 303a from the IVR device 103, and stores this information into the storage 303. The information storage 304a also stores information of the customer information 303b and the supporting information condition table 303c that are obtained from the input section 301 and other computer via the LAN 105, into the storage 303.

The record information creator 304b creates information concerning a transmission record of each piece of information transmitted to the customer telephones 100a to 100c. Specifically, the record information creator 304b creates information including a transmission record of information transmitted to the customer, a transmission time of each piece of information, whether each piece of information is transmitted to the end, a response time required for the IVR device to respond to a call from the customer, a customer's waiting time when a call from the customer is transferred to the operator, by referring to the log information 303a.

Further, the record information creator 304b searches the customer information 303b for individual information of the customer whose call is received using a telephone number or the like as a key, and creates customer information data.

Further, the record information creator 304b creates information concerning a diagram and a graph that express a ratio of amount of information transmitted to the user communication apparatus to a total amount of each piece of information.

For example, assume that a transmission processing of the explanation of a certain product shifts to the explanation of other product after Y seconds since the start of the explanation while X seconds are required to complete the transmission of the explanation about this product. In this case, a ratio of the actual transmission amount to the total amount of the product information becomes "Y/X×100" percent. The record information creator 304b creates data that expresses this ratio in a diagram or a graph.

The supporting information creator 304c creates supporting information that supports the operator to respond to a call from the customer based on the information concerning the transmission record of each piece of information created by the record information creator 304b. Specifically, the supporting information creator 304c decides whether the transmission record of each piece of information satisfies the condition set out in the supporting information display condition table 303c. When the condition is satisfied, the supporting information creator 304c creates display data corresponding to this condition.

The record information output section 304d outputs the information created by the record information creator 304b and the supporting information creator 304c to the corresponding one the operator terminal devices 104a to 104c of the operator to whom a call from the customer is transferred.

Figure 6:
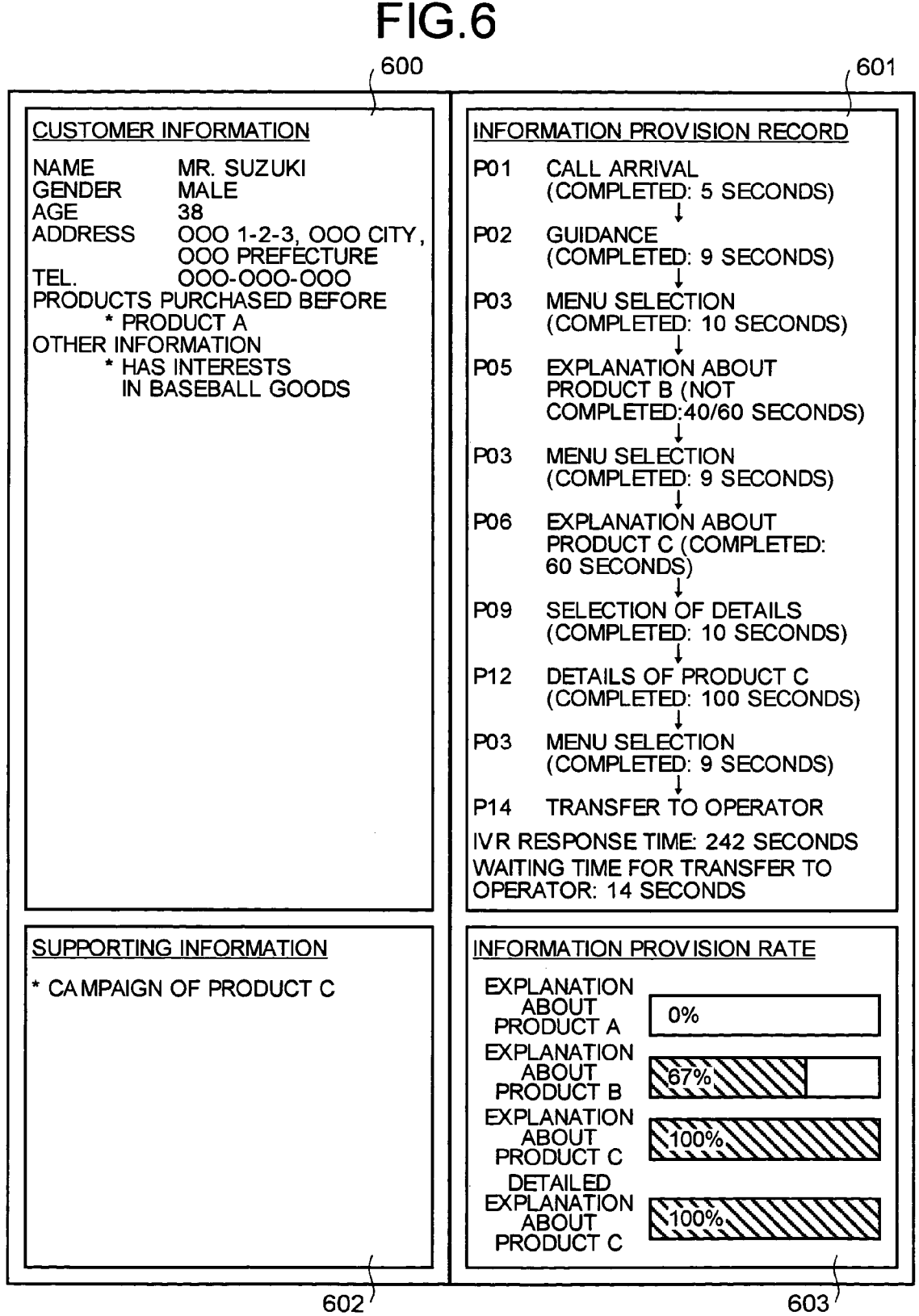
FIG. 6 illustrates a first example of an output screen that is output to operator terminal devices.

The output screen that is output to the operator terminal devices 104a to 104c will be explained next. FIG. 6 illustrates a first example of an output screen that is output to operator terminal devices 104a to 104c. As shown in FIG. 6, this output screen includes a customer information domain 600, an information provision record domain 601, a supporting information domain 602, and an information provision supply rate domain 603.

The customer information domain 600 displays the customer information 303b that is explained with reference to FIG. 3. The customer information domain 600 displays information about customer name, address, and telephone number, and information about products that the customer purchased in the past.

The information provision record domain 601 displays record information of each piece of information transmitted to the customer telephones 100a to 100c. Specifically, the information provision record domain 601 displays information including contents and order of processing that the IVR device 103 executes, a time taken to execute each processing, information about whether each processing is completed, a response time taken for the IVR device 103 to respond to a call from the customer, and a customer's waiting time when a call from the customer is transferred to the operator.

The supporting information domain 602 displays supporting information that supports the operator to respond to the customer. In the example shown in FIG. 6, as the transmission of the detailed information about the product C to the customer telephones 100a to 100c is completed, the supporting information of "campaign of the product C" is displayed in the supporting information domain 302 as a result of the decision made based on the supporting information display condition shown in FIG. 5.

The information provision rate domain 603 displays in a graph the information concerning a ratio of the amount of information transmitted to the communication apparatus of the user (i.e., information provision rate) to the amount of each piece of information. In the example shown in FIG. 6, the output screen displays that the information provision rate is 0 percent as the product A is not explained, that the product B is explained by 67 percent of the total explanation, and that the explanation about the product C and the detailed explanation about the product C are completed, that is, the information is provided by 100 percent.

Figure 7:
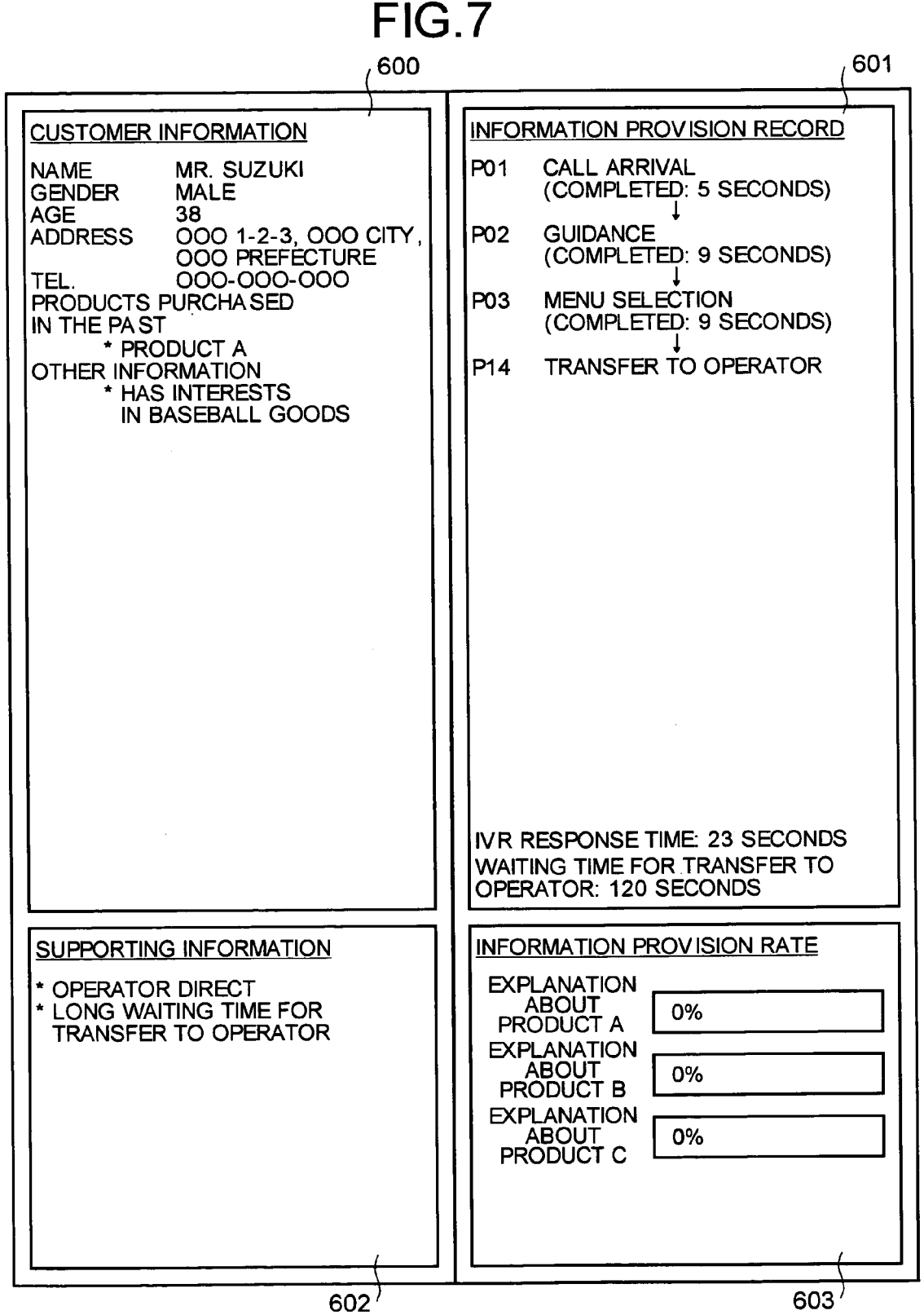
FIG. 7 illustrates a second example of an output screen that is output to operator terminal devices.

FIG. 7 illustrates a second example of the output screen that is output to operator terminal devices 104a to 104c. As shown in FIG. 7, in this example, the customer is directly connected to the operator without listening to the explanation about the product as shown in the information provision record domain 601. Therefore, as a result of the decision made based on the supporting information display condition shown in FIG. 5, supporting information of "operator direct" is displayed in the supporting information domain 602.

As the customer's waiting time for the customer call to be transmitted to the operator is 120 seconds, supporting information of "customer waiting long for transfer (apology is necessary)" is displayed as a result of the decision made based on the supporting information display condition shown in FIG. 5.

As explained above, the operator can respond to the customer promptly and properly, by referring to the information of the customer information, the information provision record, the supporting information, and the information provision rate. Consequently, there is an advantage that burdens of the operator can be reduced.

Figure 8:
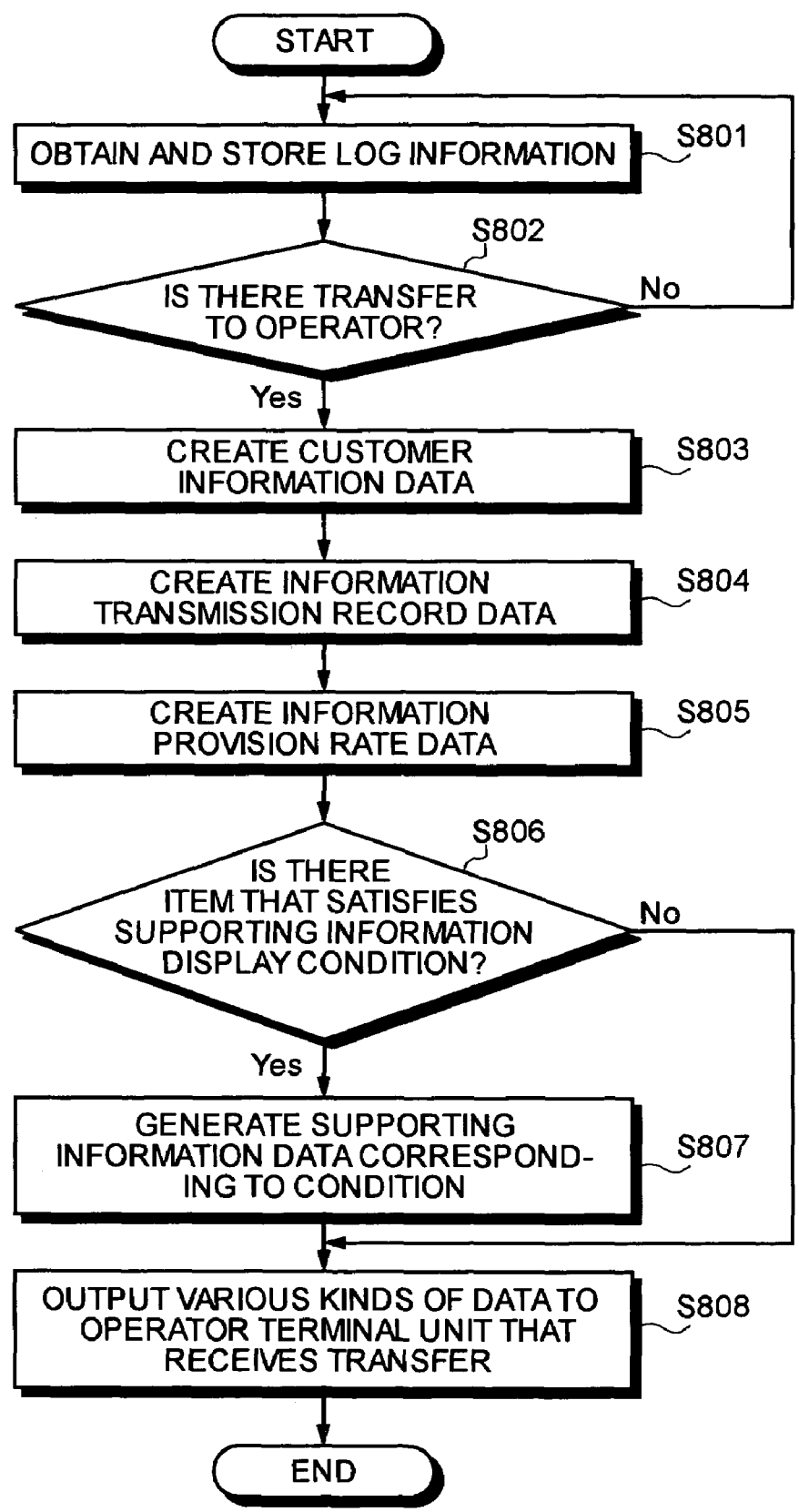
FIG. 8 is a flowchart that illustrates steps of a processing by the user information management device.

Steps of the processing that the user information management device 106 according to the present embodiment carries out will be explained next. FIG. 8 is a flowchart that illustrates the steps of the processing that the user information management device 106 according to the present embodiment carries out.

As shown in FIG. 8, first, the user information management device 106 obtains the log information 303a transmitted from the IVR device 103, and stores the log information into the storage 303 (step S801). The user information management device 106 searches the log information 303a to check whether there is a call from the customer that is transferred to the operator (step S802).

When there is no call that is transferred to the operator (No at step S802), the process proceeds to step S801, and the user information management device 106 continues the obtaining and storing of the log information 303a. When there is a call that is transferred to the operator (Yes at step S802), the user information management device 106 searches the customer information 303b for the customer information corresponding to this call, using the customer telephone number or the like as a key, and creates customer information data to be provided to the operator (step S803).

The user information management device 106 then creates the information transmission record data concerning the information that is transmitted to the customer (step S804). The user information management device 106 calculates the information provision rate of each piece of information, and creates graph data that expresses the information provision rate in a graph (step S805).

Thereafter the user information management device 106 refers to the supporting information display condition table 303c shown in FIG. 5, and checks whether there is an item that satisfies the display condition of the supporting information in the transmission record of the information to the customer (step S806). When there is no item that satisfies the display condition (No at step S806), the process proceeds to step S808.

When there is an item that satisfies the display condition (Yes at step S806), the user information management device 106 creates the supporting information data corresponding to the supporting condition (step S807). Then, the user information management device 106 outputs the data created in each processing to the corresponding one of the operator terminal devices 104a to 104c that received the transfer of the customer call (step S808), and ends the processing.

The corresponding one of the operator terminal devices 104a to 104c that received data from the user information management device 106 displays this data on the screen of the display device, thereby notifying the operator about the information.

As described above, according to the present embodiment, when a call transmitted from any one of the operator terminal devices 104a to 104c is received, the record information creator 304b creates the information concerning the transmission record of each piece of information that is transmitted to this operator terminal device in the call. The supporting information creator 304c creates the supporting information that supports the operator in responding to the call. The information output section 304d outputs the information to the corresponding one of the operator terminal devices 104a to 104c of the operator to whom the customer call is transferred. Therefore, burdens of the operator can be reduced, and the customer information can be managed for the operator to be able to respond to the customer promptly and properly.

A computer system such as a personal computer or a workstation can execute a program created in advance to achieve the user information management device 106 and the user information management method that are explained in the present embodiment.

A computer system that executes a user information management program having functions similar to those of the user information management device 106 (and the user information management method) explained in the present embodiment will be explained next.

Figure 9:
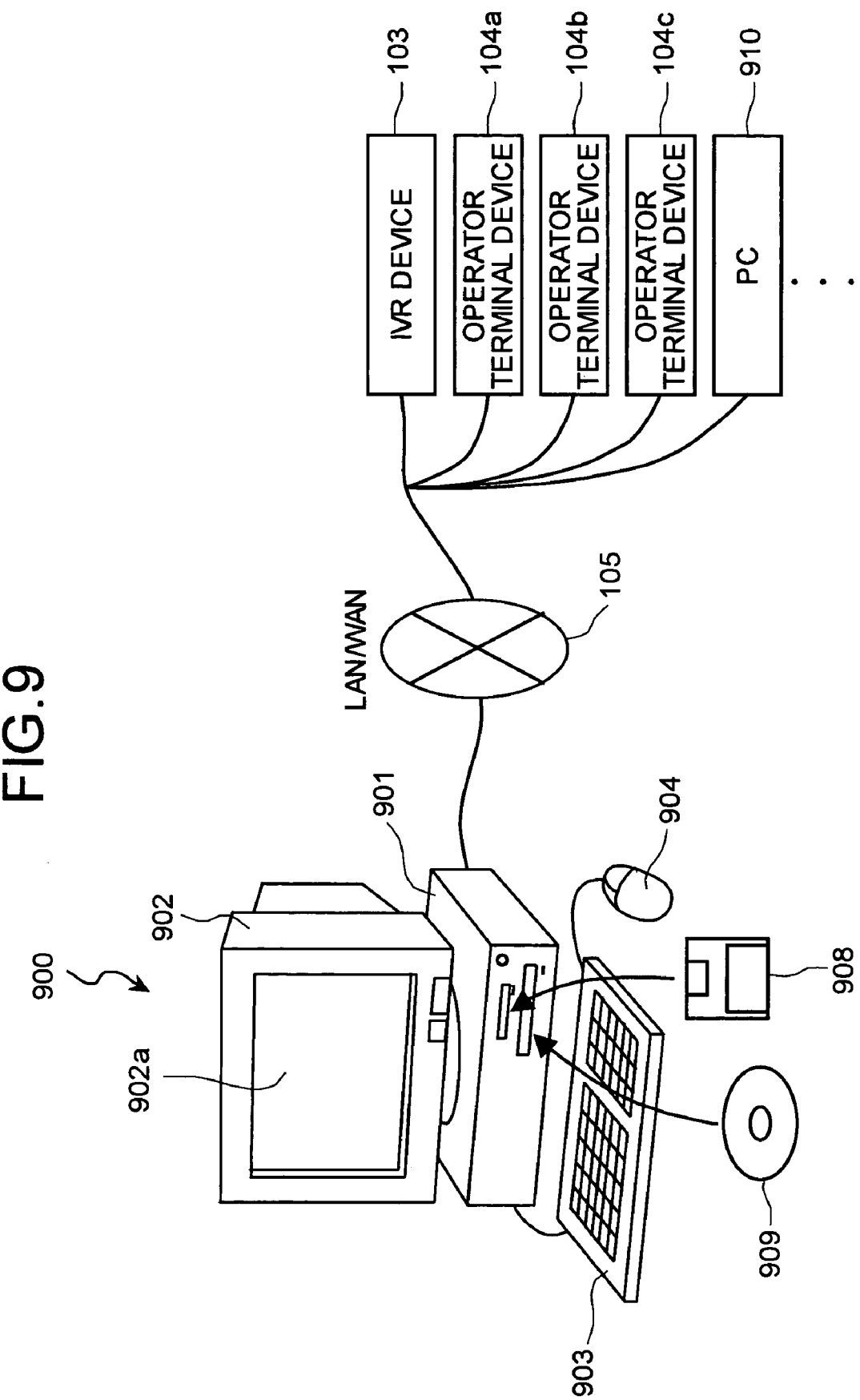
FIG. 9 is a system configuration diagram that illustrates a configuration of a computer system according to the present invention.
Figure 10:
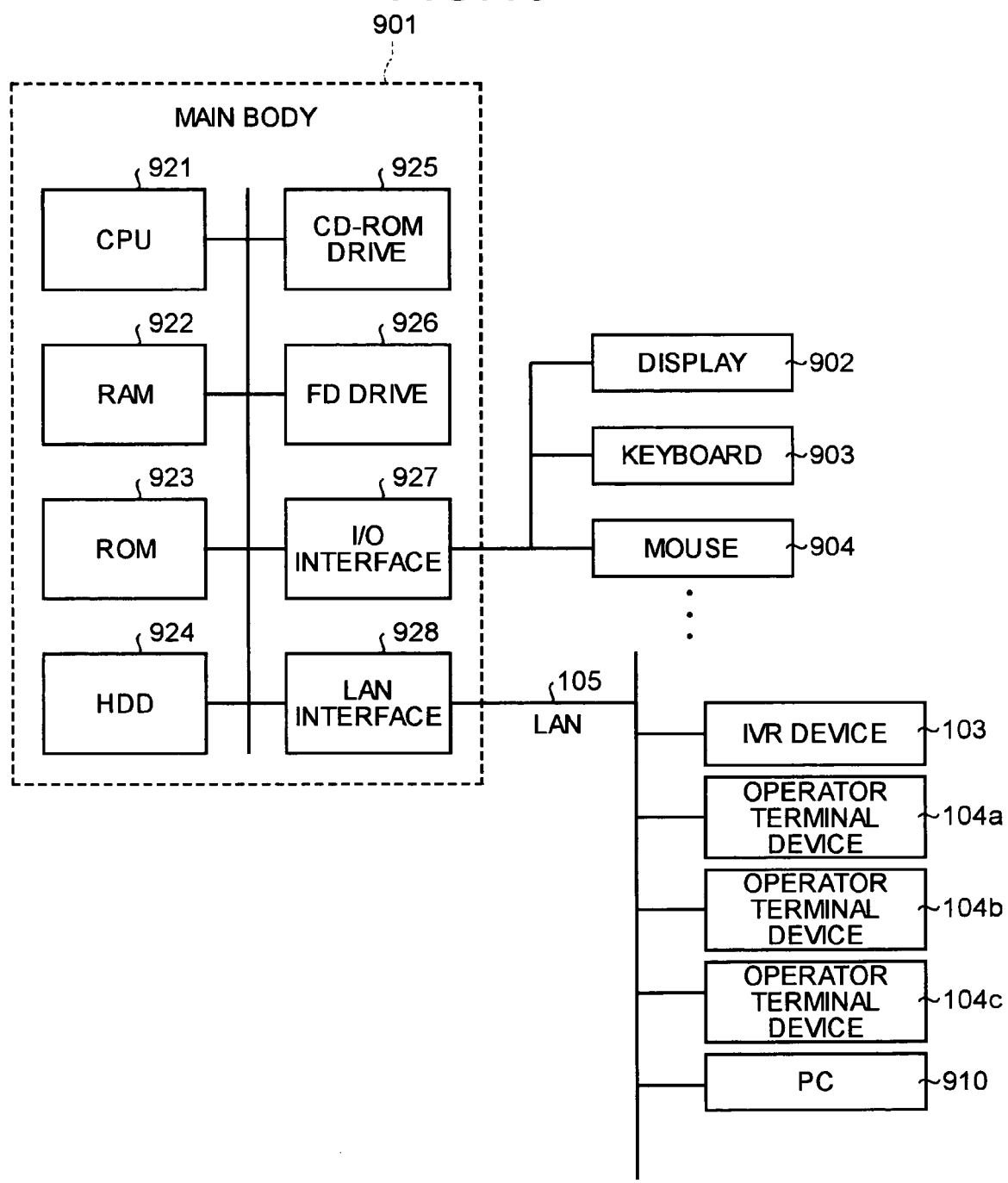
FIG. 10 is a block diagram that illustrates a configuration of a main body concerning the computer system shown in FIG. 9.

FIG. 9 is a system configuration diagram that illustrates the configuration of the computer system according to the present embodiment. FIG. 10 is a block diagram that illustrates the configuration of a main body concerning the computer system shown in FIG. 9.

As shown in FIG. 9, a computer system 900 according to the present embodiment comprises a main body 901, a display 902 that displays the information such as an image on a display screen 902a according to an instruction from the main body 901, a keyboard 903 that is used to input various kinds of information to the computer system 900, and a mouse 904 that is used to instruct an optional position on the display screen 902a of the display 902.

As shown in FIG. 10, the main body 901 of the computer system 900 includes a central processing device (CPU) 921, a random access memory (hereinafter, "RAM") 922, a read only memory (ROM) 923, a hard disk drive (HDD) 924, a CD-ROM drive 925 in which a CD-ROM 909 is inserted, a flexible disk (FD) drive 926 in which an FD 908 is inserted, the display 902, an I/O interface 927 which connects the keyboard 903 and the mouse 904, and a LAN interface 928 which is connected to a local area network or a wide are network (hereinafter, "LAN/WAN").

This computer system 900 is also connected with the IVR device 103, the operator terminal devices 104a to 104c, and other computer system (personal computer) 910, via a LAN interface 928 and the LAN/WAN 105.

The computer system 900 reads the user information management program that is recorded on a predetermined recording medium, and executes this program, thereby achieving the user information management device 106 (and the user information management method).

The predetermined recording medium includes all kinds of recording mediums that store the user information management program that the computer system 900 can read, such as a "portable physical medium", a "fixed physical medium", and a "communication medium". The "portable physical medium" includes the FD 908, the CD-ROM 909, a magneto optical (MO) disk, a digital versatile disk (DVD), an optical magnetic disk, and an IC card. The "fixed physical medium" includes the HDD 924, the RAM 922, and the ROM 923 that are provided at the inside and outside of the computer system 900. The "communication medium" includes a public line 907 that is connected via a modem 905, and the LAN/WAN 105 to which other computer system 910 is connected. These communication media hold the program during a short period of time at the time of transmitting the program.

Namely, the user information management program is computer readably recorded on recording media such as the "portable physical medium", the "fixed physical medium", or the "communication medium". The computer system 900 reads out and executes the user information management program from these recording media, thereby achieving the user information management device 106 and the user information management method.

The user information management program is not limited to be executed by the computer system 900. The present invention can be similarly applied to the other computer system 910 that executes the user information management program, and to these computer systems that cooperates to execute the user information management program.

While the present invention is explained with reference to the exemplary embodiments, the present invention can also be implemented in various other different embodiments within a scope of a technical spirit described in the appended claims.

For example, in the present embodiment, the user information management device 106 independent of the IVR device 103 creates the transmission record information of the information that is transmitted to the customer telephones 100a to 100c, and outputs the transmission record information to the operator terminal devices 104a to 104c to which the customer call is transferred. However, the present invention is not limited to this configuration, and the IVR device 103 may be configured to have these functions in addition to the voice response function.

In the present embodiment, while customers use the customer telephones 100a to 100c to transmit push button signals and communicate with operators, the present invention is not limited to this configuration. It is also possible to achieve these operations using other communication apparatuses having the communication function, such as, for example, a personal digital assistant (PDA) or a personal computer having the communication function.

The whole or a part of the processing that is explained to be executed automatically may be executed manually. Also, the whole or a part of the processing that is explained to be executed manually may be executed automatically according a known method.

Information that includes various data such as the processing steps, control steps, and specific names, information including various data and parameters shown in the document and the drawings may be optionally changed except where specified otherwise.

The constituent elements of each device in the drawings show only concepts, and they need not be physically configured as illustrated in the drawings. In other words, detailed modes of decentralization and integration of each device are not limited to those shown in the drawings. The whole or a part of the elements of the device may be configured in decentralization or integration either functionally or physically in an optional device, according to burdens and using states.

A CPU or a program that is executed by the CPU can achieve the whole or a part of the processing functions that are achieved by each device. These functions can also be achieved as hardware according to a wired logic.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer program product including computer executable instructions stored on a computer readable medium, wherein the instructions, when executed by the computer, cause the computer to perform:
    creating transmission-record information based on information that has been transmitted to a user communication device in response to a first user call for utilizing an information provision service; and
    transmitting the transmission-record information to an operator terminal device that responds to one of the first user call and a second user call different from the first user call, the second user call being another call from a user who has transmitted the first user call by the user communication device, and wherein
    the information provided by the information provision service includes a plurality of information pieces, and the transmission-record information includes information about a transmission duration for each information piece.

2. The computer program product according to claim 1, wherein the information provided by the information provision service includes a plurality of information pieces, and the transmission-record information includes information about whether each information piece has been completely transmitted.

3. The computer program product according to claim 1, wherein the information provided by the information provision service includes a plurality of information pieces, and the transmission-record information includes data concerning a ratio of amount of each information piece that has been transmitted to the user communication device to total amount of the each information piece.

4. The computer program product according to claim 3, wherein the data indicates a diagram.

5. The computer program product according to claim 3, wherein the data indicates a graph.

6. The computer program product according to claim 1, wherein the instructions further cause the computer to perform creating supporting information that supports response communication for an operator using the operator terminal device based on the transmission-record information, wherein
    the transmitting of the transmission-record information includes transmitting the supporting information to the operator terminal device.

7. A user information management apparatus comprising:
    a transmission-record information creator that creates transmission-record information based on information that has been transmitted to a user communication device in response to a first user call for utilizing an information provision service; and
    a transmitter that transmits the transmission-record information to an operator terminal device that responds to one of the first user call and a second user call different from the first user call, the second user call being another call from a user who has transmitted the first user call by the user communication device, and wherein
    the information provided by the information provision service includes a plurality of information pieces, and the transmission-record information includes information about a transmission duration for each information piece.

8. The user information management apparatus according to claim 7, wherein the information provided by the information provision service includes a plurality of information pieces, and the transmission-record information includes information about whether each information piece has been completely transmitted.

9. The user information management apparatus according to claim 7, wherein the information provided by the information provision service includes a plurality of information pieces, and the transmission-record information includes data concerning a ratio of amount of each information piece that has been transmitted to the user communication device to total amount of the each information piece.

10. The user information management apparatus according to claim 9, wherein the data indicates a diagram.

11. The user information management apparatus according to claim 9, wherein the data indicates a graph.

12. The user information management apparatus according to claim 9, further comprising a supporting information creator that creates supporting information which supports response communication for an operator using the operator terminal device based on the transmission-record information, wherein
    the transmitter transmits the supporting information to the operator terminal device.

13. A computer program product including computer executable instructions stored on a computer readable medium, wherein the instructions, when executed by the computer, cause the computer to perform:
    creating transmission-record information based on information that has been transmitted to a user communication device in response to a first user call for utilizing an information provision service; and transmitting the transmission-record information to an operator terminal device that responds to a second user call different from the first user call, the second user call being another call from a user who has transmitted the first user call by the user communication device, wherein the creating of the transmission-record information includes supporting information that supports response communication for an operator using the operator terminal device based on the transmission-record information, and wherein the transmitting of the transmission-record information includes transmitting the supporting information to the operator terminal device.

14. A user information management apparatus comprising:

a transmission-record information creator that creates transmission-record information based on information that has been transmitted to a user communication device in response to a first user call for utilizing an information provision service;

a transmitter that transmits the transmission-record information to an operator terminal device that responds to a second user call different from the first user call, the second user call being another call form a user who has transmitted the first user call by the user communication device; and a supporting information creator that creates supporting information which supports response communication for an operator using the operator terminal device based on the transmission-record information, wherein the transmitter transmits the supporting information to the operator terminal device.

* * * * *